Patented July 18, 1950

2,516,064

UNITED STATES PATENT OFFICE 2,516,064

POLYMERIZATION IN THE PRESENCE OF COBALT SALTS

Barnard M. Marks, Newark, N. J., assignor to E. I. du Pont de Nemours & Company, Wilmington, Del., a corporation of Delaware No Drawing. Application August 7, 1946, Serial No. 688,977

4 Claims. (Cl. 260—86.1)

This invention relates to the polymerization of organic compounds having two polymerizable groups and more particularly to the polymerization of a dimethacrylate ester of a glycol or the dimethacrylate esters of a mixture of glycols, either alone or in admixture with another polymerizable compound in the presence of a polymerization catalyst.

It is known in the art that an increase in the concentration of catalyst increases the rate of the polymerization reaction and also that the desired quality of the polymer to be produced limits the concentration of catalyst which may be employed. Nevertheless, in the polymerization of the materials within the scope of this invention, the prior art has been unable to obtain the desired rate of polymerization without decreasing the quality of the polymer produced to below the quality desired.

An object of this invention is to provide novel catalyzed polymerizable monomer compositions, a new process of polymerizing compounds having two polymerizable groups, and the improved products resulting therefrom. A further object is to provide an improved process of polymerizing the dimethacrylate esters of a mixture of glycols. Another object is to provide such a process of polymerizing said materials in the presence of dissolved oxygen, the process being characterized by an unusually high rate of polymerization and the polymer product being characterized by improved properties, e. g. exceptional scratch resistance and hardness, and freedom from fissures and bubbles. Other objects will be apparent from the description of this invention given hereinafter.

The above objects are accomplished according to the present invention by a process which comprises subjecting a monomer composition comprising a dimethacrylate ester of a glycol or the dimethacrylate esters of a mixture of glycols, either alone or in admixture with another polymerizable or polymerized compound, to polymerization conditions in the presence of a monomer-soluble inorganic cobalt salt, e. g. cobalt nitrate, as the sole polymerization catalyst or in combination with another polymerization catalyst, e. g. a free radical catalyst—alpha,-alpha'-azo-diisobutyronitrile being a particularly suitable free radical catalyst. More specifically, when cobalt nitrate is used as the sole catalyst, the preferred concentration of catalyst is about 1.0%–4.0% calculated as the hexahydrate, and when a second catalyst is used therewith the preferred concentration of catalyst is approximately 0.04%–1.0% of cobalt nitrate calculated as the hexahydrate, and 0.05%–1.0% of said second catalyst, the combined amounts of said catalysts not exceeding about 1.5%. The concentration of catalyst is based on the weight of monomeric material present.

Polymerizable compounds within the scope of this invention may be prepared by (1) esterification of methacrylic acid with a glycol (2) esterification of methacrylic acid with a mixture of glycols or (3) mixing two or more preformed esters obtained according to (1), the comonomer compositions being indistinguishable in the latter two cases. A satisfactory method of preparing polymerizable compounds applicable to the present invention is disclosed in copending application Serial Number 671,395 of Anderson and Ramler filed May 21, 1946, entitled "Bifunctional Methacrylates."

The following examples illustrate specific embodiments of the present invention. All parts are by weight unless otherwise specified. By room temperature is meant about 25° C.

Example I

*Comonomers.*—Dimethacrylate esters of polyethylene glycol 200.

*Catalyst.*—Cobalt nitrate hexahydrate.

Polyethylene glycol 200, as hereinafter referred to in the specification, is a mixture of various glycols which mixture has an average molecular weight of 200±15. A typical analysis follows:

| Wt., percent | Material | Molecular weight |
|---|---|---|
| 2.78 | Monoethylene glycol | 62 |
| 5.6 | Diethylene glycol | 106 |
| 18.47 | Triethylene glycol | 150 |
| 18.1 | Tetraethylene glycol | 194 |
| 12.25 | Pentaethylene glycol | 238 |
| 4.6 | Hexaethylene glycol | 282 |

The distillation analysis was then stopped with 36.5% higher boiling glycols left as residue. The average molecular weight of the mixture is 205.5.

Five samples of 100 parts each of the dimethacrylate esters of polyethylene glycol 200 were polymerized in the presence of cobalt nitrate hexahydrate as follows:

| Sample No. | Parts of CO(NO₃)₂·6H₂O | Time of Polymerization | Specific Gravity of Polymer |
|---|---|---|---|
| 1 | ½ | Over 6 hours | |
| 2 | 1 | 5 hours | 1.23 |
| 3 | 2 | 4¼ hours | 1.24 |
| 4 | 3 | 4 hours | 1.24 |
| 5 | 5 | 3½ hours | 1.25 |

All polymerizations were conducted in the presence of normal diffused daylight and at room temperature. It was noted that the cobalt nitrate hexahydrate did not go into complete solution in sample number 5; however, the presence of excess cobalt nitrate hexahydrate solid had no visible effect upon the polymerization. Sample No. 1 cracked during polymerization. All other samples were completely free from any internal flaws of this nature. All samples were characterized by an intense red color.

*Example II*

Comonomers.—Dimethacrylate esters of polyethylene glycol 200. Dimethacrylate esters of polyethylene glycol 400.
Catalysts.—Cobalt nitrate hexahydrate and alpha,alpha'-azo-diisobutyronitrile.

Parts
Dimethacrylate esters of polyethylene glycol 200 _____ 100
Dimethacrylate esters of polyethylene glycol 400 _____ 50
Alpha,alpha'-azo-diisobutyronitrile _____ 1.5
Cobalt nitrate hexahydrate _____ 0.30

A homogeneous solution consisting of the above ingredients was divided into four parts and completely polymerized with the periods of time indicated and under the following conditions: Part one was heated in the dark for 170 minutes at 35° C. Part two was maintained at room temperature isolated from all light for 420 minutes. Part three was maintained at room temperature and exposed to diffused daylight for 55 minutes. Part four was heated in the dark for 90 minutes at 85° C. All samples were free from defects such as cracks, voids and bubbles.

The dimethacrylate esters of polyethylene glycol 400 are prepared by esterification of methacrylic acid with a mixture of various glycols, said mixture having an approximate average molecular weight of 400 and containing a wide range of various glycols.

*Example III*

Monomer.—Diethylene glycol dimethacrylate.
Catalysts.—Cobalt nitrate hexahydrate. Benzoyl peroxide.

Parts
Diethylene glycol dimethacrylate _____ 100
Benzoyl peroxide _____ 1
Cobalt nitrate hexahydrate _____ 0.3

A homogeneous solution containing the above ingredients was divided into two parts and completely polymerized within the periods of time indicated and under the following conditions: For 240 minutes part one was maintained at room temperature and covered with red cellophane to exclude light therefrom. Part two was maintained at room temperature and exposed to diffused daylight for 80 minutes. Both products were free from defects such as fissures, voids and bubbles.

*Example IV*

Comonomers.—Dimethacrylate esters of polyethylene glycol 200.
Catalysts.—Cobalt nitrate hexahydrate. Ultra violet light.

Parts
Dimethacrylate esters of polyethylene glycol 200 _____ 100
Cobalt nitrate hexahydrate _____ 2

A homogeneous solution of the above ingredients was irradiated with ultra violet light at room temperature. Polymerization was complete in 65 minutes. The quality of the product was comparable to that obtained in the above examples.

*Example V*

Comonomers.—Dimethacrylate esters of polyethylene glycol 200. Methyl methacrylate.
Catalyst.—Cobalt nitrate hexahydrate. Ultra violet light.

Parts
Dimethacrylate esters of polyethylene glycol 200 _____ 150
Methyl methacrylate _____ 100
Cobalt nitrate hexahydrate _____ 5

The cobalt nitrate hexahydrate was completely dissolved in the dimethacrylate esters of polyethylene glycol 200. To this catalyzed mixture was carefully added, with agitation, the monomeric methyl methacrylate. The resulting homogeneous mixture was divided into two parts and completely polymerized within the time limits and under the conditions indicated below: Part one was subjected to a temperature of 85° C. for four hours. Part two was exposed to ultra violet light at room temperature for 165 minutes. The solid copolymers of said esters and methyl methacrylate were transparent, homogeneous and free from flaws.

*Example VI*

Comonomers.—Dimethacrylate esters of polyethylene glycol 200.
Polymer.—Polyvinyl acetate.
Catalyst.—Cobalt nitrate hexahydrate.

Parts
Dimethacrylate esters of polyethylene glycol 200 _____ 100
Polyvinyl acetate _____ 25
Cobalt nitrate hexahydrate _____ 2.5

A solution of the above ingredients was prepared by first dissolving the vinyl acetate polymer in the dimethacrylate esters of polyethylene glycol 200. Then, to this solution was added 2.5 parts of cobalt nitrate hexahydrate and the mixture was agitated until the catalyst had completely dissolved. The solution thus prepared was completely polymerized by heating at 85° C. for 210 minutes. The product was a homogeneous solid, free from flaws.

*Example VII*

Comonomer:—Dimethacrylate esters of polyethylene glycol 200.
Catalyst:—Cobalt chloride hexahydrate.

Parts
Dimetharcrylate esters of polyethylene glycol 200 _____ 100
Cobalt chloride hexahydrate _____ 2

A homogeneous solution of the above ingredients was completely polymerized by exposure to diffused daylight at 30° C. for 28 hours. The product, a solid, homogeneous blue colored polymer, was free from defects such as cracks, fissures and voids.

While the present invention has been described with particular reference to a preferred embodiment thereof, i. e. the polymerization of the dimethacrylate esters of certain commercial mixtures of glycols, it is also applicable to the polymerization of the dimethacrylate esters of other mixtures of glycols as well as the dimethacrylate ester of any particular glycol. However, those esters prepared from the mixtures of glycols which are commercially available normally will be employed. These commercially available mixtures of glycols, designated according to their average molecular weight, include polyethylene glycol 200, 300 and 400. The preferred mixtures of glycols are those having an average molecular weight between 185 and 270 and having the formula $HO-(CH_2-CH_2-O)_n-H$ wherein $n$ is an integer. Specifically preferred is the mixture of glycols having an average molecular weight of approximately 200. Referring to these preferred mixtures of glycols, a suitable glycol mixture may be obtained from any combination of glycols having the formula $HO-(CH_2-CH_2-O)_n-H$ wherein the integer $n$ usually varies from 1 to about 20, although $n$ may be higher than 20 providing the mixture has the desired average molecular weight.

The catalysts of this invention comprise any inorganic cobalt salt which is soluble in the monomer compositions to be polymerized or mixtures of such cobalt salts. Examples of these salts are cobalt nitrate and cobalt chloride. In cases where an inorganic cobalt salt is found to be substantially insoluble in the monomer composition to be polymerized the salt is not included within the scope of this invention. Cobalt sulfate is a typical monomer-insoluble salt. Mixtures of two or more cobalt salts, such as cobalt nitrate and cobalt chloride, are used to achieve specific colors or polymerization rates.

Cobalt nitrate has unexpectedly been found to be considerably different from other inorganic cobalt salts in that the polymerization rate achieved through its use is at least 6 times greater than with any other cobalt salt tried. Furthermore this salt is most effective in preventing internal flaws and fissures in the polymer produced. Therefore the preferred cobalt salt for use in this invention is cobalt nitrate.

Included within the scope of the invention is the use of a monomer-soluble inorganic cobalt salt in combination with a free radical catalyst. Free radical catalysts which have been found particularly useful with cobalt nitrate, for example, include azo type compounds such as alpha,alpha' - azo - diisobutyronitrile and alpha,-alpha'-azo bis (alpha,gamma-dimethylvaleronitrile); peroxy compounds such as benzoyl peroxide, lauroyl peroxide and tertiary butyl perbenzoate. Other known catalysts such as alpha-carbonyl alcohols and their derivatives such as benzoin, acetoin and benzoin ethyl ether; and vicinal polyketaldonyl compounds such as diacetyl and glyoxal may also be used in conjunction with the inorganic cobalt salts of this invention. Various conditions known to accelerate polymerization, e. g. heat, light, electronic heat, etc., may be employed with the catalysts or catalyst combinations of this invention.

When cobalt nitrate is used as the sole catalyst in practicing this invention, it has been found that the most desirable concentration of catalyst is from about 1% to the solubility of cobalt nitrate in the dimethacrylate esters, which solubility is about 4% at room temperature. If a free radical catalyst is also present, the preferred concentration of cobalt nitrate is 0.04%–1.0% and that of the free radical catalyst 0.05%–1.0%. However, the total concentration of catalysts should not exceed about 1.5%. Concentrations of cobalt nitrate are calculated as cobalt nitrate hexahydrate. All concentrations of catalysts are based on the weight of monomeric materials employed in the polymerization.

As indicated above, heat may be used to accelerate the cobalt salt catalyzed polymerizations of this invention. However, heating is not necessary for polymerization will occur even at very low temperatures. As expected the rate of polymerization at these low temperatures is considerably decreased. For instance, polymerization at room temperature, is essentially complete in about 2 to 5 hours, while at 0° C. the reaction requires approximately two days to reach the same degree of polymerization. Thus it will be apparent that the catalyzed monomer compositions of this invention may be polymerized by subjecting them to polymerization conditions over a wide temperature range, generally from room temperature to 130° C. or even higher; but for most commercial applications, a temperature between 60° C. and 110° C. is preferred.

It has been found advantageous to dissolve the cobalt salt directly in the monomeric ester, because this simplifies the polymerization technique and reduces the cost of the operation. Further, the rate at which the cobalt salt dissolves in the ester is increased if the salt is first ground to a fine powder under an inert hydrocarbon liquid, such as hexane, and then dried.

It is within the scope of this invention to mix other materials with the monomer compositions disclosed in order to facilitate handling or to modify the proportion of the compositions for specific applications. Thus, to the monomer and comonomer compositions prior to polymerization may be added various other ethylenically unsaturated polymerizable compounds, preferably vinyl compounds, and/or their polymers and copolymers. Examples of these compounds are acrylic and alkacrylic esters such as methyl acrylate, methyl methacrylate, ethyl methacrylate, butyl methacrylate, methyl ethacrylate, and their derivatives; vinyl esters such as vinyl acetate; vinyl halides such as vinyl chloride; vinyl ester-halides. Cellulose derivatives may also be used. Besides the addition of other monomers, polymers and copolymers, there may also be added pigments, dyes, fillers, solvents, etc. as will be apparent to those skilled in the art.

An important contribution which this invention makes to the art is the unexpected discovery that in the polymerization of the materials covered herein with increased amounts of the catalysts, particularly cobalt nitrate, disclosed herein, there is a marked increase in the rate of polymerization, accompanied by substantial improvements in the quality of the product, such as increased hardness, and scratch resistance and freedom from fissures and bubbles. Reasoning from conventional polymerization techniques such improvements in quality of product are most unexpected.

Furthermore, the monomer compositions of this invention are particularly subject to the inhibiting action of small amounts of dissolved oxygen, which fact requires either unduly long polymerization cycles or the use of higher temperatures than would normally be necessary. The inorganic cobalt salts of this invention provide a rapid polymerization cycle in the presence of dissolved oxygen.

The present invention is especially useful for manufacturing massive castings of various shaped articles through bulk polymerization. It is likewise desirable in many applications when used in the form of coating, laminating and impregnating compositions. This invention is also useful for preparing polymeric sheets, rods and tubes and in other applications which will be apparent to those skilled in the art. The invention is particularly useful for producing articles having high surface hardness and scratch resistance by subjecting the catalyzed monomer compositions to polymerizing conditions in situ; for example, coating the surfaces of polymethyl methacrylate sheets with the catalyzed monomer compositions then subjecting the coated sheets to electronic heating to form useful articles having hard surfaces.

The natural color of the cobalt salts are such that the invention is not applicable where a colorless polymer is required. For example, the natural color of cobalt nitrate is such that polymers produced therewith have a pleasing red color.

As many apparently widely different embodiments of this invention may be made without departing from the spirit and scope thereof, it is to be understood that the invention is not limited to the specific embodiments thereof except as defined in the appended claims.

I claim:

1. Process which comprises maintaining at room temperature to 130° C. a composition comprising the dimethacrylate esters of a mixture of glycols having the formula $$HO-(CH_2-CH_2-O)_n-H$$

wherein $n$ is an integer, said mixture having an average molecular weight of approximately 200, and, as a polymerization catalyst therefor, 1.0% to 4.0% of cobalt nitrate based on the weight of said esters, until said esters are polymerized.

2. Process which comprises maintaining at room temperature to 130° C. a composition comprising the dimethacrylate ester of a glycol and, as a polymerization catalyst therefor, 1.0% to 4.0% of cobalt nitrate based on the weight of said ester, until said ester is polymerized.

3. Process which comprises maintaining at 0° C. to 130° C. a composition comprising the dimethacrylate esters of a mixture of glycols having the formula $HO-(CH_2-CH_2-O)_n-H$, wherein $n$ is an integer, said mixture having an average molecular weight between 185 and 270, and, as a polymerization catalyst therefor, 1.0% to 4.0% of cobalt nitrate based on the weight of said esters, until said esters are polymerized.

4. Process which comprises maintaining at 0° C. to 130° C. a composition comprising the dimethacrylate ester of a glycol and, as a polymerization catalyst therefor, 1.0% to 4.0% of cobalt nitrate based on the weight of said ester, until said ester is polymerized.

BARNARD M. MARKS.

REFERENCES CITED

The following references are of record in the file of this patent:

UNITED STATES PATENTS

| Number | Name | Date |
|---|---|---|
| 2,129,722 | Woodhouse | Sept. 13, 1938 |
| 2,308,236 | Pollack | Jan. 12, 1943 |
| 2,380,405 | Browning et al. | July 31, 1945 |
| 2,380,473 | Stewart | July 31, 1945 |